(12) United States Patent
Zhuo et al.

(10) Patent No.: US 10,761,761 B2
(45) Date of Patent: Sep. 1, 2020

(54) METHOD AND DEVICE FOR MANAGING STORAGE SYSTEM

(71) Applicant: EMC IP Holding Company LLC, Hopkinton, MA (US)

(72) Inventors: Baote Zhuo, Beijing (CN); Geng Han, Beijing (CN); Jian Gao, Beijing (CN); Jamin Jianbin Kang, Beijing (CN); Lifeng Yang, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 161 days.

(21) Appl. No.: 16/021,218

(22) Filed: Jun. 28, 2018

(65) Prior Publication Data

US 2019/0004728 A1    Jan. 3, 2019

(30) Foreign Application Priority Data

Jun. 30, 2017   (CN) .......................... 2017 1 0524411

(51) Int. Cl.
*G06F 3/06* (2006.01)
*G06F 11/10* (2006.01)

(52) U.S. Cl.
CPC ............ *G06F 3/0644* (2013.01); *G06F 3/061* (2013.01); *G06F 3/0619* (2013.01); *G06F 3/0631* (2013.01); *G06F 3/0635* (2013.01); *G06F 3/0689* (2013.01); *G06F 11/1076* (2013.01); *G06F 3/0607* (2013.01)

(58) Field of Classification Search
CPC .... G06F 3/0644; G06F 3/0635; G06F 3/0619; G06F 3/0631; G06F 3/0689; G06F 3/0607; G06F 3/064; G06F 3/0604; G06F 11/1076
See application file for complete search history.

(56) References Cited

U.S. PATENT DOCUMENTS

| | | | |
|---|---|---|---|
| 9,779,015 B1 * | 10/2017 | Oikarinen | G06F 12/02 |
| 10,126,988 B1 | 11/2018 | Han et al. | |
| 10,140,041 B1 | 11/2018 | Dong et al. | |
| 10,146,447 B1 | 12/2018 | Dong et al. | |
| 10,146,456 B1 | 12/2018 | Gao et al. | |
| 10,210,045 B1 | 2/2019 | Gao et al. | |
| 10,289,336 B1 | 5/2019 | Liu et al. | |
| 10,318,169 B2 | 6/2019 | Dalmatov et al. | |
| 10,445,295 B1 | 10/2019 | Han et al. | |
| 10,459,814 B2 | 10/2019 | Gao et al. | |
| 10,496,482 B1 | 12/2019 | Foley et al. | |

(Continued)

*Primary Examiner* — Ramon A. Mercado
(74) *Attorney, Agent, or Firm* — BainwoodHuang

(57) ABSTRACT

The present disclosure relates to a method and device for managing a storage system. Specifically, in one implementation of the present disclosure, there is proposed a method for managing a storage system. The method comprises: obtaining a state record on utilization of a resource pool for creating the storage system, the resource pool comprising a first number of storage devices, the state record comprising a time sequence in which extents in the first number of storage devices are selected to create the storage system; selecting extents from the first number of storage devices to create the storage system according to the state record; and updating the state record on the basis of the selected extents. In one implementation of the present disclosure, there is proposed a device for managing a storage system.

20 Claims, 10 Drawing Sheets

(56) References Cited

U.S. PATENT DOCUMENTS

| | | | |
|---|---|---|---|
| 10,552,078 B2 | 2/2020 | Gong et al. | |
| 10,592,111 B1 | 3/2020 | Wang et al. | |
| 10,599,357 B2 | 3/2020 | Gao et al. | |
| 2003/0212872 A1* | 11/2003 | Patterson | G06F 3/0601 |
| | | | 711/165 |
| 2008/0126734 A1* | 5/2008 | Murase | G06F 3/0613 |
| | | | 711/170 |
| 2010/0011085 A1* | 1/2010 | Taguchi | G06F 3/0605 |
| | | | 709/214 |
| 2014/0082317 A1* | 3/2014 | Brooker | G06F 3/0605 |
| | | | 711/171 |
| 2015/0006816 A1* | 1/2015 | Gong | G06F 3/0647 |
| | | | 711/114 |
| 2015/0286419 A1* | 10/2015 | Guo | G06F 3/0613 |
| | | | 711/114 |

\* cited by examiner

METHOD AND DEVICE FOR MANAGING STORAGE SYSTEM

FIELD

This application claim priority from Chinese Patent Application Number CN 201710524411.4, filed on Jun. 30, 2017 at the State Intellectual Property Office, China, titled "METHOD AND APPARATUS FOR MANAGING STORAGE SYSTEM" the contents of which is herein incorporated by reference in its entirety.

FIELD

Various implementations of the present disclosure relate to storage management, and more specifically, to a method and device for managing a storage system (e.g., Redundant Array of Independent Disks (RAID)).

BACKGROUND

With the development of data storage techniques, various data storage devices provide users with an increasingly high data storage capacity, and also their data access speed has been improved greatly. Besides the increase of data storage capacity, users also impose greater and greater demands on data reliability and response time of storage systems. So far various RAID-based data storage systems have been developed to improve data reliability. When one or more disks in a storage system fail, data in failing disk(s) can be recovered from other normal disk.

Mapped RAID has been developed so far. In this mapped RAID, a disk is a logical concept and may comprise multiple extents that may be distributed over different physical storage devices. Regarding multiple extents in one stripe of mapped RAID, it is desired that the multiple extents are distributed over different physical storage devices so that when a physical storage device where one extent among the multiple extents is located fails, data may be recovered from a physical storage device where other extent is located. In mapped RAID, a huge computation load is involved to determine the distribution of extents in various stripes over multiple physical storage devices. Therefore, it is a tough issue regarding how to determine the distribution of extents in a simpler but more effective way.

SUMMARY

Therefore, it is desirable to develop and implement a technical solution for managing a storage system more efficiently. It is desired that the technical solution can be compatible with existing storage systems and manage them more efficiently by changing their various configurations.

In one implementation of the present disclosure, there is provided a method for managing a storage system. The method comprises: obtaining a state record on utilization of a resource pool for creating the storage system, the resource pool comprising a first number of storage devices, the state record comprising a time sequence in which extents in the first number of storage devices are selected to create the storage system; selecting extents from the first number of storage devices to create the storage system according to the state record; and updating the state record on the basis of the selected extents.

In one implementation of the present disclosure, there is provided a device for managing a storage system. The device comprises: one or more processors; a memory coupled to at least one processor of the one or more processors; computer program instructions stored in the memory which, when executed by the at least one processor, cause the device to execute a method for managing a storage system. The method comprises: obtaining a state record on utilization of a resource pool for creating the storage system, the resource pool comprising a first number of storage devices, the state record comprising a time sequence in which extents in the first number of storage devices are selected to create the storage system; selecting extents from the first number of storage devices to create the storage system according to the state record; and updating the state record on the basis of the selected extents.

In one implementation of the present disclosure, there is provided a device for managing a storage system, comprising: an obtaining module configured to obtain a state record on utilization of a resource pool for creating the storage system, the resource pool comprising a first number of storage devices, the state record comprising a time sequence in which extents in the first number of storage devices are selected to create the storage system; a selecting module configured to select extents from the first number of storage devices to create the storage system according to the state record; and an updating module configured to update the state record on the basis of the selected extents.

In one implementation of the present disclosure, there are provided computer program instructions which, when executed by at least one processor, cause the at least one processor to execute a method for managing a storage system as described above.

With the technical solution of the present disclosure, extents may be more efficiently selected from a resource pool to create a storage system, and further the storage system may be managed more efficiently.

BRIEF DESCRIPTION OF THE SEVERAL VIEWS OF THE DRAWINGS

Through the more detailed description in the accompanying drawings, the above and other objects, features and advantages of the implementations of the present invention will become more apparent. Several implementations of the present invention are illustrated schematically and are not intended to limit the present invention. In the drawings.

DETAILED DESCRIPTION

Some preferable implementations will be described in more detail with reference to the accompanying drawings, in which the preferable implementations of the present disclosure have been illustrated. However, the present disclosure can be implemented in various manners, and thus should not be construed to be limited to the implementations disclosed herein. On the contrary, those implementations are provided for the thorough and complete understanding of the present disclosure, and completely conveying the scope of the present disclosure to those skilled in the art.

Figure 1:
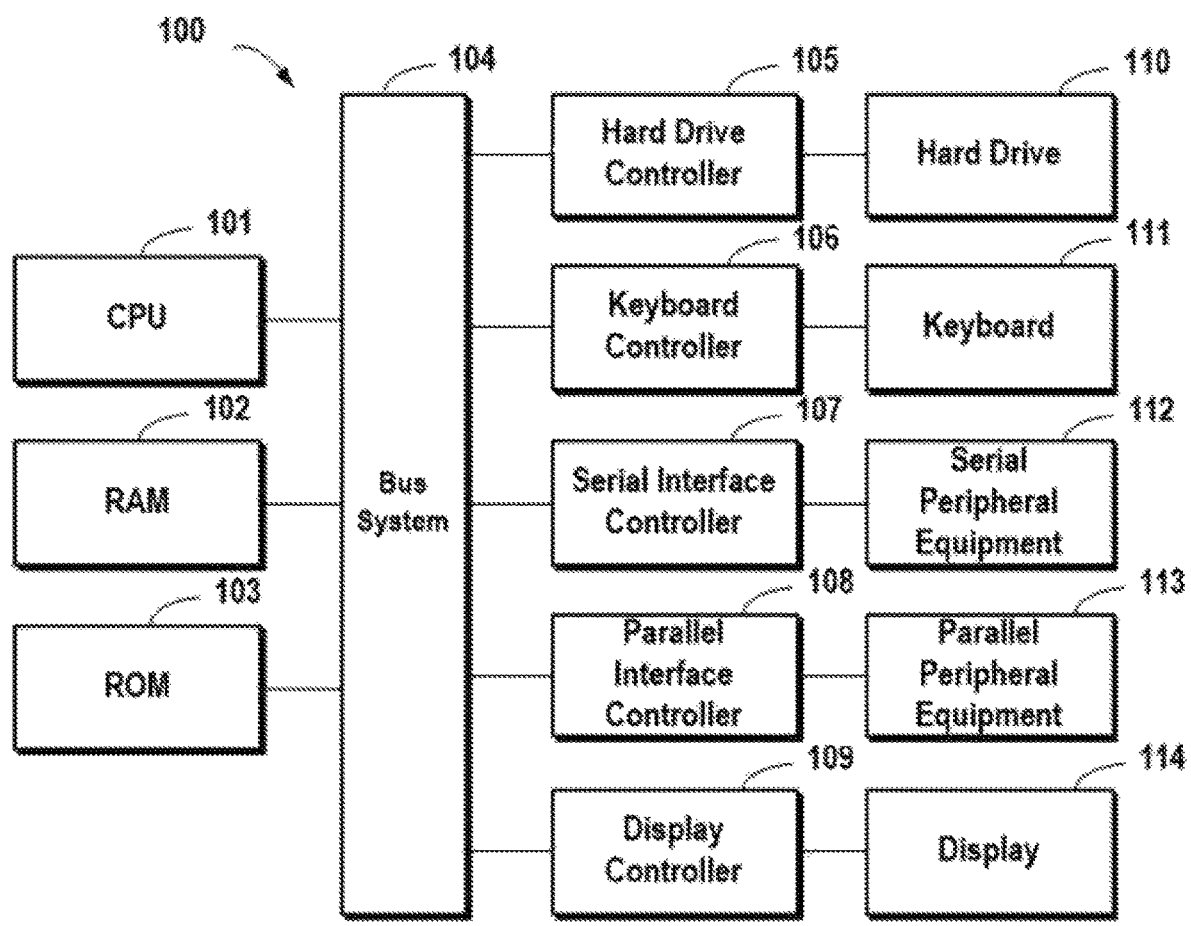
FIG. 1 schematically illustrates a block diagram of an exemplary computer system which is applicable to implement the implementations of the present disclosure.

FIG. 1 illustrates an exemplary computer system 100 which is applicable to implement the implementations of the present invention. As illustrated in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as illustrated in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware implementation, an entirely software implementation (including firmware, resident software, micro-code, etc.) or one implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to implementations of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Redundant Array of Independent Disks (RAID) may combine multiple storage devices into an array of disks. By providing redundant storage devices, the reliability of an entire disk array is caused to significantly exceed that of a single storage device. RAID may offer various advantages over a single storage device, for example, enhancing data integrity, enhancing fault tolerance, increasing throughput or capacity, etc. There exist a number of RAID standards, such as RAID-1, RAID-2, RAID-3, RAID-4, RAID-5, RAID-6, triple-parity RAID, etc. For more details about RAID levels, those skilled in the art may refer to https://en.wikipedia.org/wiki/Standard_RAID_levels and https://en.wikipedia.org/wiki/Nested_RAID_levels, etc.

Figure 2A:
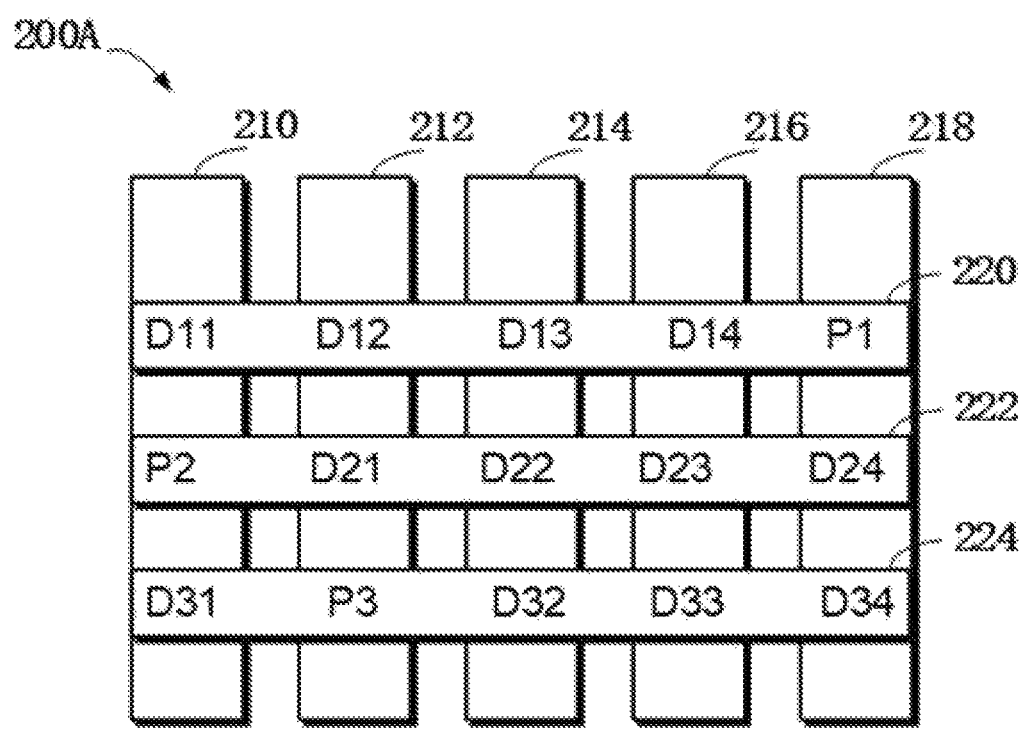
FIGS. 2A and 2B each schematically illustrate a view of an application environment where the implementations of the present disclosure may be implemented.

FIG. 2A schematically illustrates a schematic view 200A of a structure of RAID according to one technical solution. In this figure, RAID-5 (4D+1P, wherein 4D indicates four storage devices are used for storing data, while 1P indicates one storage device is used for storing a P parity) which consists of five independent storage devices (210, 212, 214, 216 and 218) are taken as an example for illustrating working principles of RAID. It should be noted although FIG. 2A shows only five storage devices, in other implementations more or less storage devices may be provided according to different levels of RAID. Moreover, although FIG. 2A shows stripes 220, 222 and 224, in other examples the RAID system may further comprise a different number of stripes.

In RAID, a stripe crosses multiple physical storage devices (for example, the stripe 220 crosses the storage devices 210, 212, 214, 216 and 218). The stripe may simply be construed as a storage area among multiple storage devices which satisfies a given address range. Data stored in the stripe 220 comprises multiple parts: a data block D11 stored in the storage device 210, a data block D12 stored in the storage device 212, a data block D13 stored in the storage device 214, a data block D14 stored in the storage device 216, and a data block P1 stored in the storage device 218. In this example, the data blocks D11, D12, D13 and D14 are stored data, and the data block P1 is a parity of the stored data.

The way of storing data in other stripes is similar to that in the stripe 220A, and the difference is that a parity of other data block may be stored in other storage device than the storage device 218. In this manner, when one of the multiple storage devices 210, 212, 214, 216 and 218 fails, data in the failing device may be recovered from other normal storage devices.

Figure 2B:
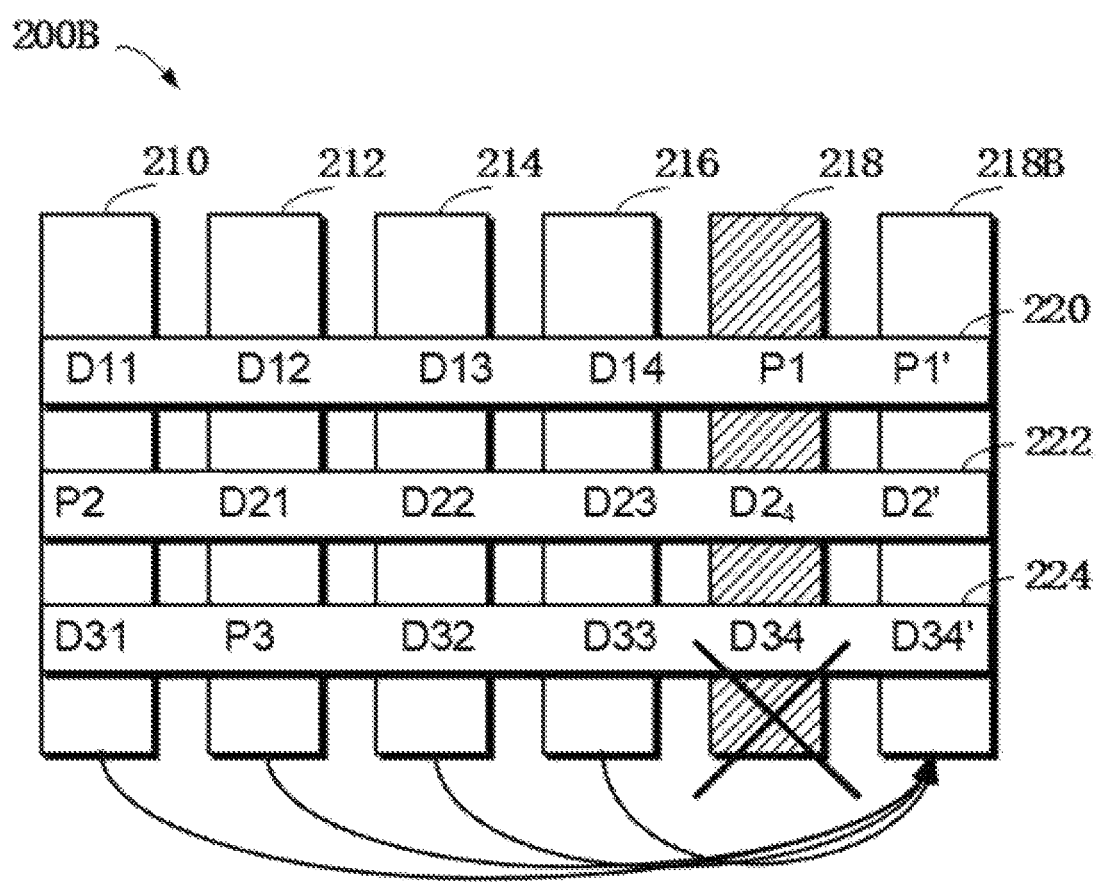

FIG. 2B schematically illustrates a schematic view 200B of the process of a RAID rebuild. As shown in FIG. 2B, when one storage device (e.g., the storage device 218 shown in shadow) fails, data may be recovered from the remaining storage devices 210, 212, 214 and 216 that operate normally. At this point, a new backup storage device 218B may be added to RAID to replace the storage device 218. In this manner, recovered data may be written to 218B, and a system rebuild may be effected.

It is noteworthy as a RAID-5 storage system consisting of 5 storage devices (4 of which are used for storing data and 1 of which is used for storing a parity) has been described with reference to FIGS. 2A and 2B, a storage system comprising a different number of storage devices may further exist according to the definition of other RAID level. For example, as RAID-6 defines, two storage devices may be used to store parities P and Q respectively. For another example, as triple-parity RAID defines, three storage devices may be used to store parities P, Q and R respectively.

Figure 3:
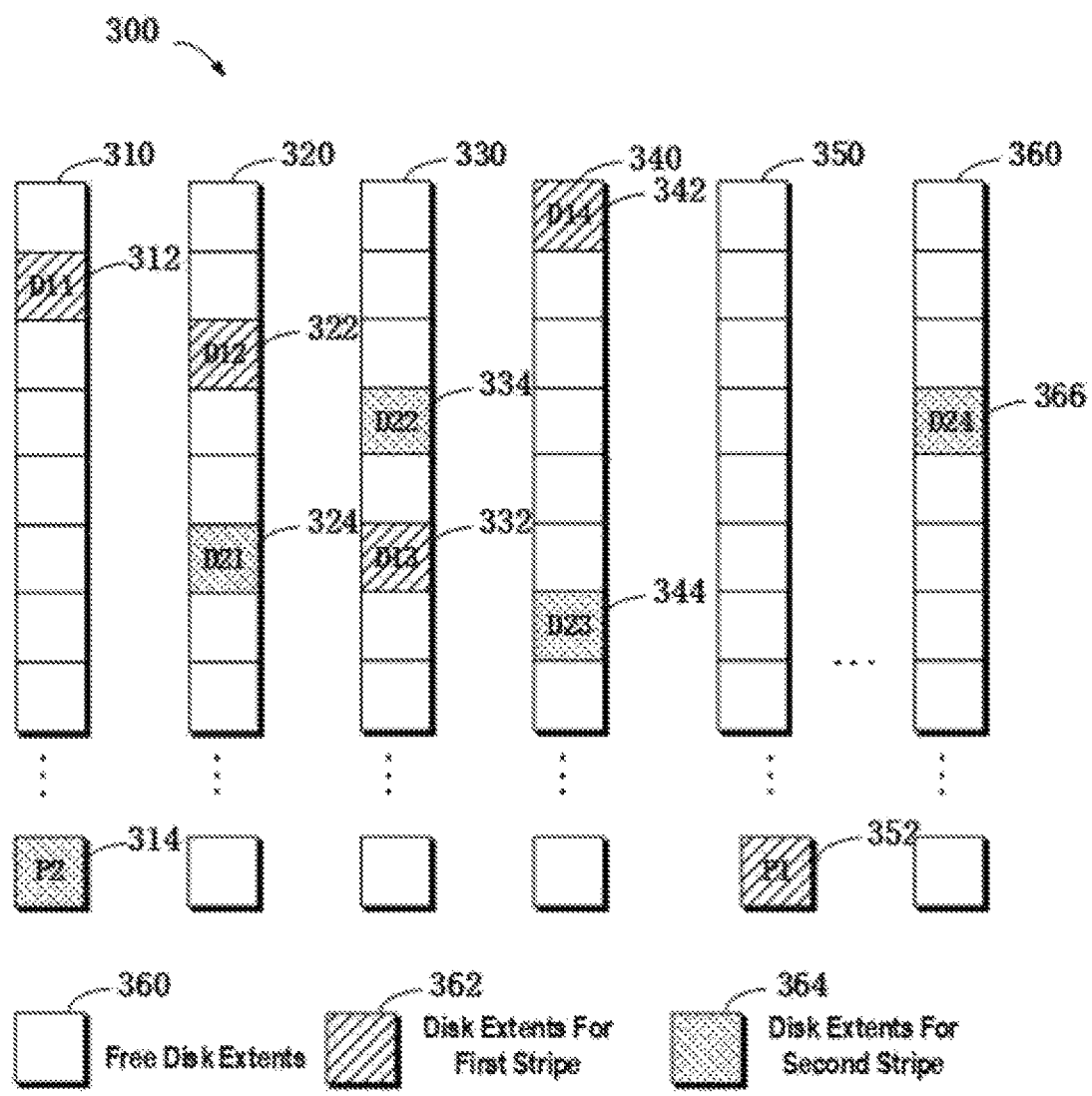
FIG. 3 schematically illustrates a block diagram of the distribution of extents in a mapped RAID storage system.

FIG. 3 schematically shows a block diagram 300 of the distribution of extents in a mapped RAID storage system. This figure illustrates multiple storage devices 310, 320, 330, 340, . . . , 350, 360. Each storage device may comprise multiple extents, among which blank extents 360 denote free extents, extents 362 shown in slashes denote extents used for a first stripe, and extents 364 shown in shades denote extents used for a second stripe. At this point, extents 312, 322, 332, 342 and 352 used for the first stripe are used to store data blocks D11, D12, D13, D14 and a parity P1 of the first stripe, and extents 324, 334, 344, 366 and 314 are used to store data blocks D21, D22, D23, D24 and a parity P2 of the second stripe.

It is noteworthy that FIG. 3 illustrates how to evenly distribute extents in various stripes over multiple storage systems in a resource pool by taking a 4D+1P RAID-5 storage system as an example. When other RAID levels are adopted, those skilled in the art may implement concrete details on the basis of above-described principles. For example, in a 6+2 RAID-6 storage system, 8 extents in each stripe may be evenly distributed over multiple storage devices, and further a load balance among the multiple storage devices may be guaranteed.

One example of the distribution of multiple extents in two stripes over multiple storage devices has been illustrated with reference to FIG. 3. Where mapped RAID consists of more storage devices, possible distribution modes will increase significantly. For example, suppose the resource pool consists of n storage devices, and each stripe in mapped RAID consists of m extents. At this point, there can be possible ways to distribute extents in mapped RAID (wherein $C_n^m$ is a combination formula $$C_n^m = \frac{A_n^m}{m!} = \frac{n!}{m!(n-m)!}\Big).$$

Specifically, where 4D+1P RAID-5 mapped RAID is created on 16 storage devices, the distribution of extents will have $C_n^m = C_{16}^{5m} = 4368$ possibilities. In mapped RAID, when n and m are set to larger values, a heavier computation load will be caused.

To strike a load balance among various physical storage devices, extents in each stripe should be evenly distributed over the various physical storage devices as much as possible. Technical solutions for determining the distribution of extents in each stripe have been proposed. In one technical solution, whether the distribution is even or not may be evaluated using neighborhood matrices (n×n matrices). However, neighborhood matrices will lead to a large computation load, especially when n is provided with a great value.

Figure 4:
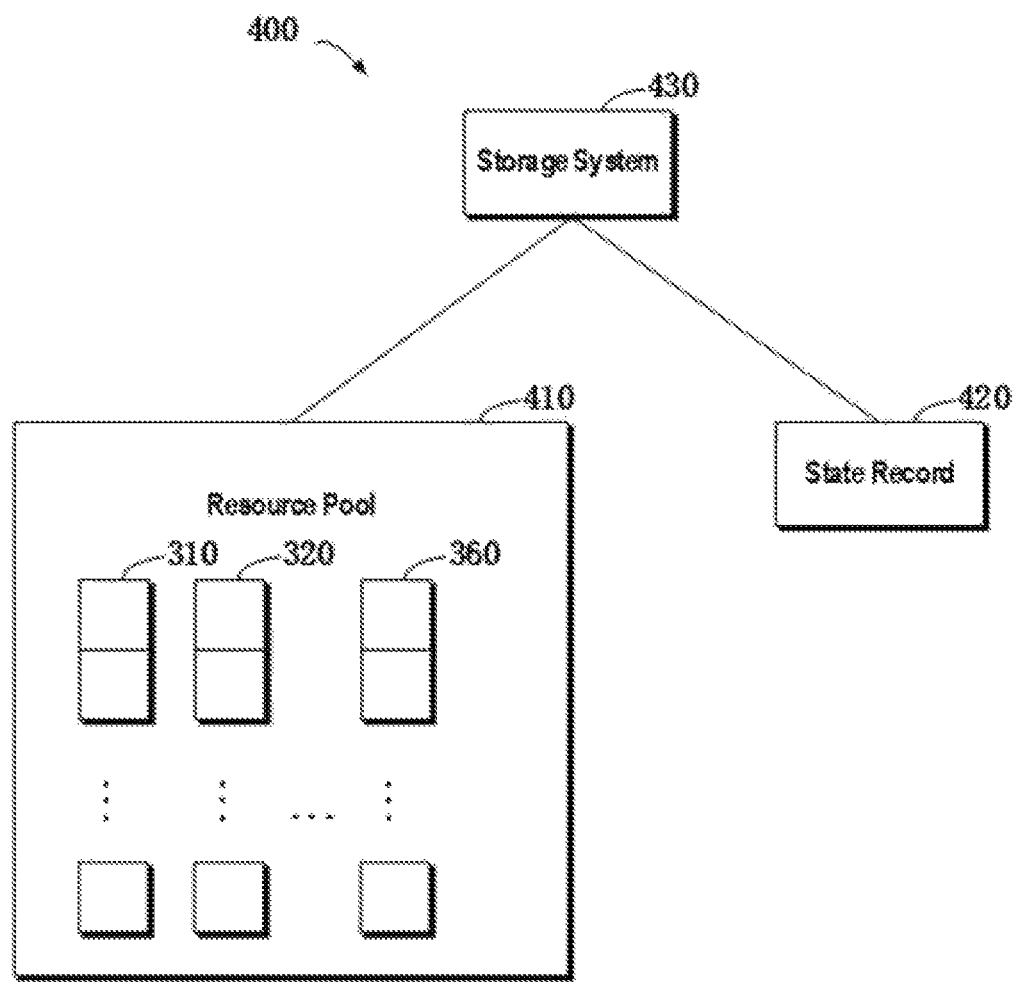
FIG. 4 schematically illustrates an architecture view for managing a storage system according to one implementation of the present disclosure.

To overcome the foregoing drawbacks, the implementations of the present disclosure provide a method, device and program product for managing a storage system. Specifically, according to one implementation of the present disclosure, there is provided a technical solution for managing a storage system. FIG. 4 schematically shows an architecture view 400 for managing a storage system according to one implementation of the present disclosure. As shown in FIG. 4, when creating a storage system 430 (e.g., mapped RAID shown with reference to FIG. 3), extents in stripes to be comprised in the storage system are selected from a resource pool 410 consisting of a plurality of (a first number of) storage devices 310, 320, . . . , 360. At this point, a state record 420 that describes utilization of the resource pool 410 for creating the storage system may be maintained. Subsequently, the storage system 430 is created on the basis of the state record 420. While creating the storage system 430, the state record 420 may further be updated on the basis of the creation procedure.

According to one implementation of the present disclosure, the state record 420 comprises a time sequence in which extents on the first number of storage devices are selected for creating the storage system 430. In light of the time sequence, extents on storage devices which have not been used recently will be selected for creating the storage system 430. In this manner, selected extents are caused to be evenly distributed over the plurality of storage devices 310, 320, . . . , 360 comprised in the resource pool 410.

Figure 5:
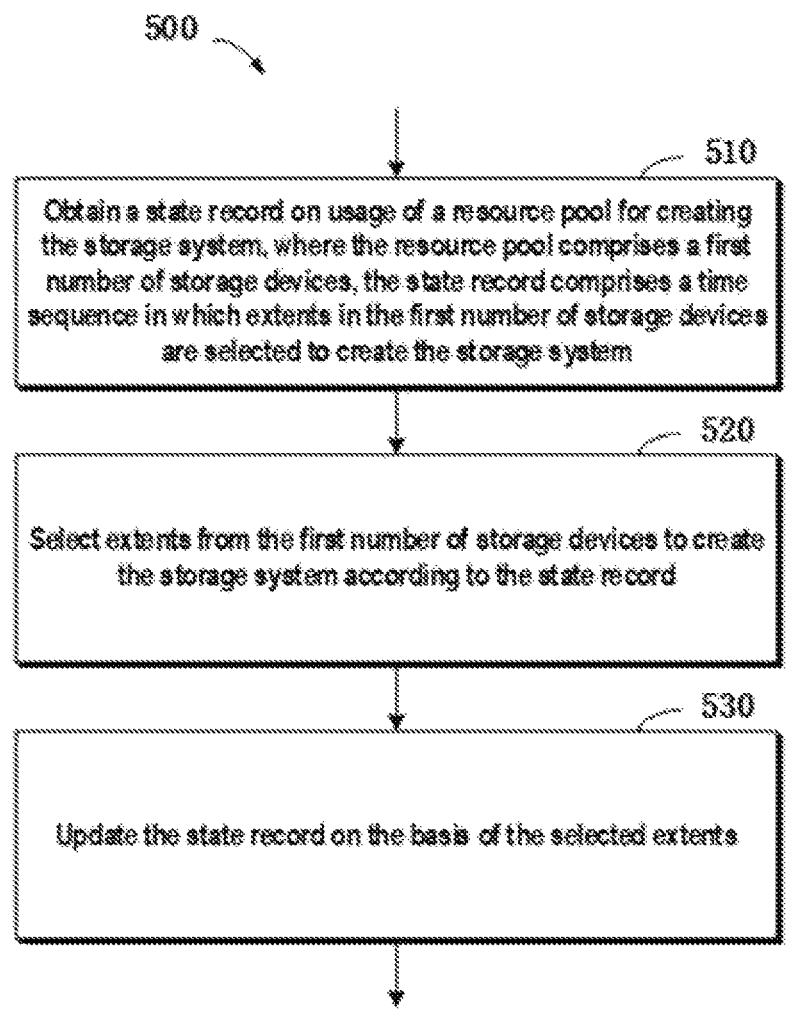
FIG. 5 schematically illustrates a flowchart of a method for managing a storage system according to one implementation of the present disclosure.

With reference to FIG. 5, a detailed description is presented below to concrete details of the method. FIG. 5 schematically shows a flowchart of a method 500 for managing a storage system according to one implementation of the present disclosure. In block 510, the state record 420 that describes utilization of the resource pool 410 for creating the storage system 430 is obtained.

The resource pool 410 comprises a first number of storage devices, and the state record 420 comprises a time sequence in which extents in the first number of storage devices are selected for creating the storage system. In this implementation, the state record 420 may be stored on the basis of various data structures. For example, the state record 420 may be stored in a data table, a linked list or other data structure.

In block 520, according to the state record 420, extents are selected from the first number of storage devices to create the storage system 430. Generally speaking, the storage system 430 may comprise a plurality of stripes, each of which may comprise a different number of extents in accordance with different rules. Subsequently, while creating a stripe, a free extent may be selected from extents comprised in the multiple storage devices, and then the selected extent is added to the stripe.

In block 530, the state record 420 is updated on the basis of the selected extent. At this point, since an extent is selected in block 520, the time sequence comprised in the state record 420 has changed, and further the state record 420 needs to be updated on the basis of the selected extent.

Subsequently, operations in blocks 520 and 530 may be repeated, so that extents to be comprised in the storage system 430 may be selected on the basis of the updated latest state record 420.

According to one implementation of the present disclosure, since the storage system 430 may comprise a plurality of stripes, a predefined number of stripes to be comprised in the storage system 430 need to be determined first. Then, the operation for creating a single stripe may be executed the predefined number of times, and created stripes may be added to the storage system 430. In this implementation, according to the state record 420, extents are selected from the first number of storage devices to create stripes in the storage system 430, till the number of stripes in the storage system 430 is up to the predefined number of stripes.

It will be appreciated that a stripe may comprise a different number of extents according to the type of the storage system 430. In one implementation of the present disclosure, in order to create a given stripe in the storage system 430, first a predefined number of extents to be comprised in the given stripe need to be determined. For example, where the storage system 430 is 4D+1P RAID-5 shown with reference to FIG. 3, each stripe may comprise 4+1=5 extents. For another example, where the storage system 430 is a 4D+1P+1Q (wherein 4D means the storage system comprises four storage devices for storing data, 1P means the storage system comprises one storage device for storing a P parity, and 1Q means the storage system comprises one storage device for storing a Q parity) RAID-6 storage system, one stripe may comprise 4+1+1=6 extents.

While creating a stripe, the process of selecting an extent and adding the same to the stripe may be repeated. Specifically, extents to be comprised in the given stripe are selected from the resource pool 410 on the basis of the state record, till the number of extents in the given stripe is up to the predefined number of extents. For example, regarding the 4D+1P RAID-5 storage system shown in FIG. 3, five extents to be comprised in a given stripe may be selected one after another, and the selected extent may be added to the given stripe. After the selection is made five times, the number of extents comprised in the given stripe amounts to the predefined number "5," so the operation for creating the given stripe is ended.

With the method described above, a single stripe may be created, and the storage system 430 consisting of a plurality of stripes may be created by repetitively performing the step of creating a single stripe. At this point, extents in the stripe are selected on the basis of the state record 420. Each time an extent is selected from the least recently used storage device on the basis of the state record 420. In this way, selected extents will be evenly distributed over a plurality of storage devices in the resource pool 410.

However, a case might arise in which although various extents in the storage system 430 are evenly distributed over storage devices in the resource pool, utilization ratios of these storage devices differ significantly. As a result, some storage devices in the resource pool 410 have lower utilization ratios, while some have higher utilization ratios. Therefore, such a case should be prevented.

For the storage system 430, the ideal distribution pattern of extents in the storage system 430 is as below: 1) various extents are evenly distributed over a plurality of storage devices in the resource pool; 2) each storage device among the plurality of storage devices has a like utilization ratio. The utilization ratio mentioned here refers to a ratio of selected extents to all extents in a storage device, and the ratio may indicate how much space in the storage device has been allocated for creating the storage system 430.

Further, statistics may be made on the utilization ratio of each storage device in the resource pool 410, and it is preferred to select extents from storage devices with lower utilization ratios. In this way, it may be ensured that extents in a specific storage device with a lower utilization ratio are selected preferably, and further the utilization ratio of the specific device may be increased. For example, suppose a storage device comprises 16 extents, and when three of these extents have been selected for creating the storage system 430, the utilization ratio of this storage device is 3/16.

According to one implementation of the present disclosure, the state record further comprises a utilization ratio of a corresponding storage device among the first number of storage devices. In order to ensure utilization ratios of various storage devices in the resource pool 410 are substantially equal, it is preferred to select a current extent from a storage device with a lower utilization ratio among the first number of storage devices, and the selected current extent is comprised in the given stripe.

Continuing the foregoing example, suppose the resource pool 410 comprises n storage devices, and respective utilization ratios of these storage devices are 2/16, 3/16, 4/16, 3/16, . . . , 4/16, then at this point extents should be selected from the storage device with a utilization ratio of 2/16 so as to create the storage system 430.

According to one implementation of the present disclosure, when an extent in a storage device is selected, the utilization ratio of the storage device should be updated. Specifically, when one extent in the storage device with a utilization ratio 2/16 is selected, the utilization ratio of the storage device may be updated to (2+1)/16=3/16. At this point, respective ratios of the n storage devices in the resource pool are 3/16, 3/16, 4/16, 3/16, . . . , 4/16. While selecting the next extent, since there are several storage devices each having a utilization ratio of 3/16, a selection may be made on the basis of a customized algorithm. For example, extents may be randomly selected from any storage device with a utilization ratio of 3/16, or may be selected in sequence.

According to one implementation of the present disclosure, the least recently used storage device is selected from the first number of storage devices as a current storage device according to the time sequence. Further, an extent to be comprised in the given stripe is selected from the current storage device. In this implementation, the time sequence may be stored in various modes. For example, a linked list may be arranged to store the time sequence. Specifically, the linked list may comprise nodes indicating a plurality of storage devices in the resource pool, and the nodes are arranged in a sequence that the storage devices are used.

For example, suppose each storage device in the resource pool 410 is a storage disk, and none of disks is used initially. Therefore, according to the least recently used criterion, the linked list may be represented as: disk 1→disk 2→disk 3→ . . . →disk n. Suppose an extent is selected from a disk at the head of the linked list to create the storage system 430 at all times, then one extent is selected from disk 1 first. Since disk 1 has been used, according to the least recently used criterion, disk 1 should be moved to the end of the linked list, at which point the linked list is represented as: disk 2→disk 3→ . . . →disk n→disk 1. So on and so forth, extents for creating a stripe may be selected in steps.

According to one implementation of the present disclosure, in order to ensure extents in the storage system 430 are evenly distributed and each storage device in the resource pool 410 has a similar utilization ratio, the time sequence and the utilization ratio of each storage device in the state record 420 are taken into consideration. Specifically, while creating a stripe in the storage system 430, the first extent to be comprised in the stripe may be selected on the basis of the utilization ratio of each storage device in the resource pool 410. Next, while selecting other extent to be comprised in the stripe, a selection may be made on the basis of the time sequence. In this way, on the one hand it may be ensured that respective utilization ratios of storage devices are substantially equal; on the other hand, it may be ensured that extents in the storage system 430 are evenly distributed.

According to one implementation of the present disclosure, the time sequence in the state record may be stored as other data structure. Specifically, the time sequence may comprise a historical record on a corresponding storage device among the first number of storage devices. The historical record further comprises: a node indicating the corresponding storage device, and a plurality of nodes indicating other storage devices than the corresponding storage device among the first number of storage devices.

Figure 6:
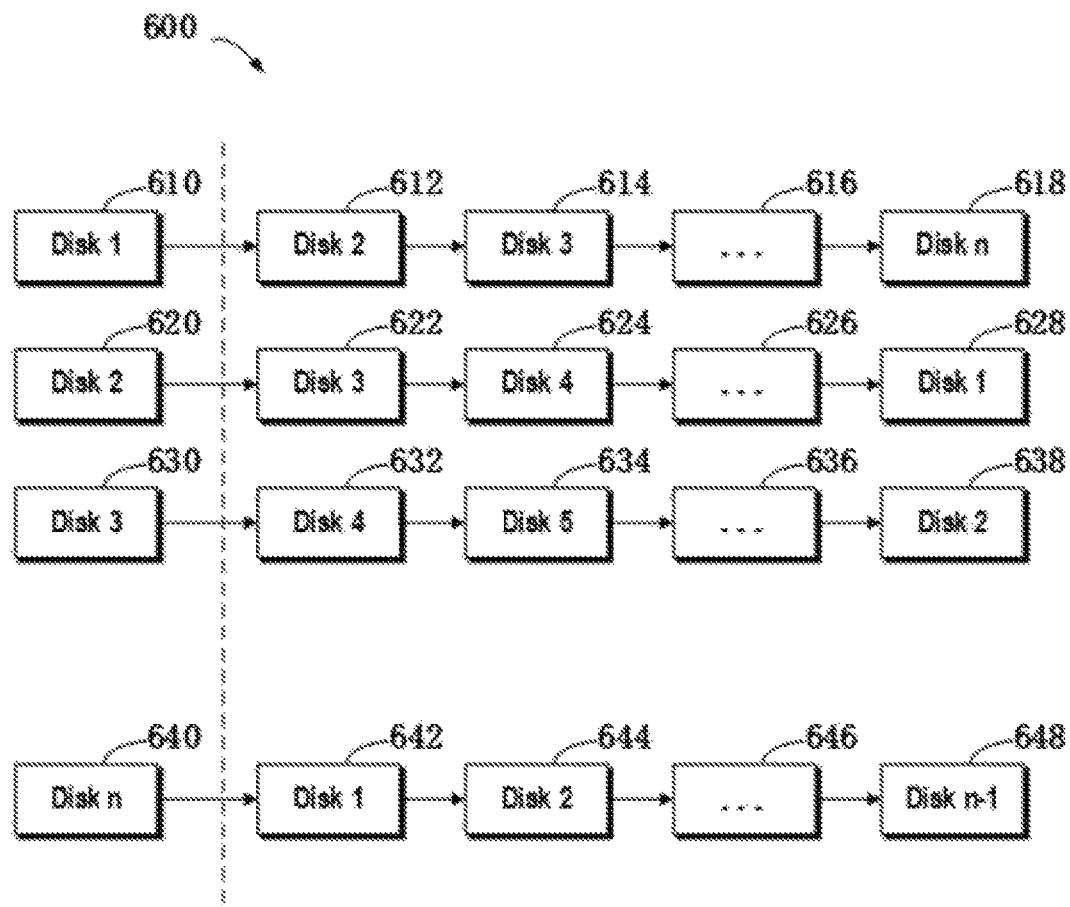
FIG. 6 schematically illustrates a block diagram of a time sequence according to one implementation of the present disclosure.

With reference to FIG. 6, a detailed description is presented below to the storage mode of the state record 420 in this implementation.

FIG. 6 schematically shows a block diagram 600 of a time sequence according to one implementation of the present disclosure. As shown in FIG. 6, the time sequence may comprise a plurality of historical records on a plurality of storage devices respectively, which are stored in the form of linked lists. For example, a historical record on disk 1 in the resource pool 410 may be provided, which historical record is shown as the first linked list in FIG. 1. Specifically, the first node 610 in the linked list indicates disk 1, i.e., meaning that the linked list is a linked list for a historical record on disk 1. The linked list further comprises nodes 612, 614, . . . , 618, which respectively indicate other disks than disk 1 in the resource pool 410, namely disk 2, disk 3, . . . , disk n.

Similarly, the second linked list as shown in FIG. 6 is a linked list for disk 2. The first node 620 in the linked list indicates disk 2, i.e., meaning that the linked list is a linked list for a historical record on disk 2. The linked list further comprises nodes 622, 624, . . . , 628, which respectively indicate other disks than disk 2 in the resource pool 410, namely disk 3, disk 4, . . . , disk 1.

Similarly, FIG. 6 further shows linked lists for other disks, which are not detailed here. It will be appreciated although FIG. 6 shows one example of the time sequence in the form of a linked list, the time sequence may further be stored as other data structures in other implementations. For example, the time sequence as shown in FIG. 6 may be stored as a data table, wherein each element in the data table stores content corresponding to a node in the linked list.

According to one implementation of the present disclosure, the plurality of nodes are arranged in a time sequence that extents in other storage devices are selected for creating the storage system. FIG. 6 schematically shows initial content of the time sequence. Initially, since none of disks has been used, the various nodes 612, 614, . . . , 618 may be arranged in a sequence of serial numbers of the disks. Similarly, the various nodes 622, 624, . . . , 628 in the second linked list may be arranged in a sequence of serial numbers of the disks. Alternatively, initially the $2^{nd}$ to $n^{th}$ nodes in each linked list may be arranged at random. As extents are selected from different disks to add into the storage system 430, various linked lists shown in FIG. 6 will be updated.

Figure 7:
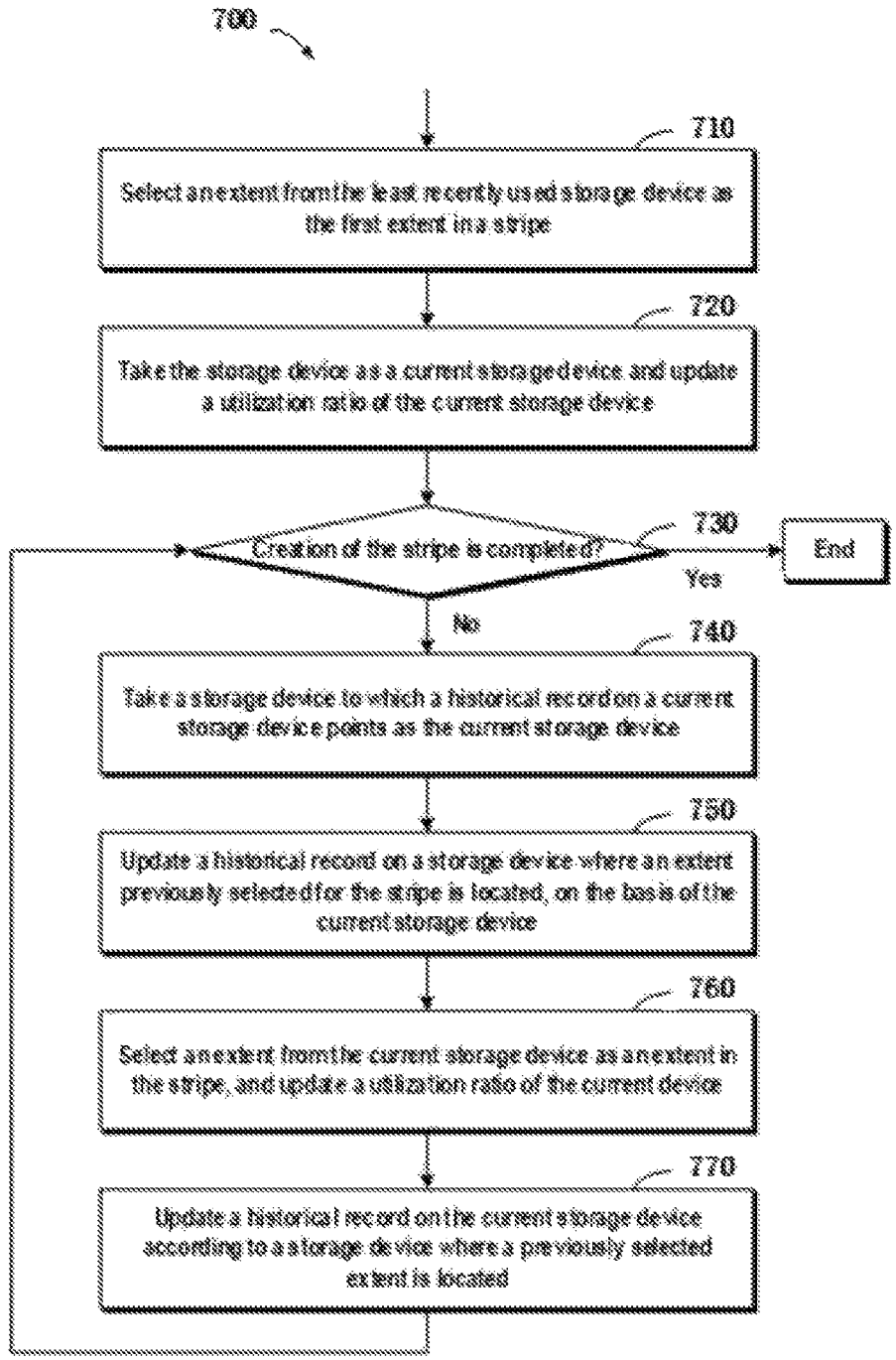
FIG. 7 schematically illustrates a flowchart of a method for creating a stripe according to one implementation of the present disclosure.

FIG. 7 schematically shows a flowchart of a method 700 for creating a stripe according to one implementation of the present disclosure. In block 710, an extent is selected from a storage device with the lowest utilization ratio, as the first extent in the stripe.

In block 720, the storage device is treated as a current storage device, and a utilization ratio of the current storage device is updated. In block 730, a judgment is made as to whether creation of the stripe is completed. If the judgment results in "yes," then the flow ends; otherwise, the flow proceeds to block 740. In block 740, a storage device to which a historical record on the current storage device points is used as a current storage device. In block 750, a historical record on a storage device where a previously selected extent for the stripe is located is updated on the basis of the current storage device. In block 760, an extent is selected from the current storage device to be an extent in the stripe, and a utilization ratio of the current device is updated. In block 770, a historical record on the current storage device is updated according to a storage device where a previously selected extent is located.

The method 700 will be described in detail by using an example of creating a stripe in the storage system 430. Continuing the foregoing example, suppose the storage system 430 supports 4D+1P RAID-5, so each stripe in the storage system 430 will comprise five extents.

Initially, a utilization ratio of each disk equals 0/16. According to the criterion of selecting the first extent from a disk with the lowest utilization ratio, in block 710 of the method 700, an extent may be selected from disk 1 and used as the first extent in the stripe. In block 720, disk 1 is treated as a current storage device, and its utilization ratio is updated to 1/16. At this point, each of disk 2 to disk n has a utilization ratio of 0/16.

Next, with reference to block 730 to block 770, illustration is presented to how to select the $2^{nd}$ to $5^{th}$ extents in the stripe. At this point, the second extent is to be selected. Since 2<5, the judgment in block 730 results in "no," and the flow proceeds to block 740. In block 740, the historical record (i.e., the first linked list in FIG. 6) on the current storage device (disk 1) points to disk 2, so disk 2 is treated as a current storage device.

Figure 8A:
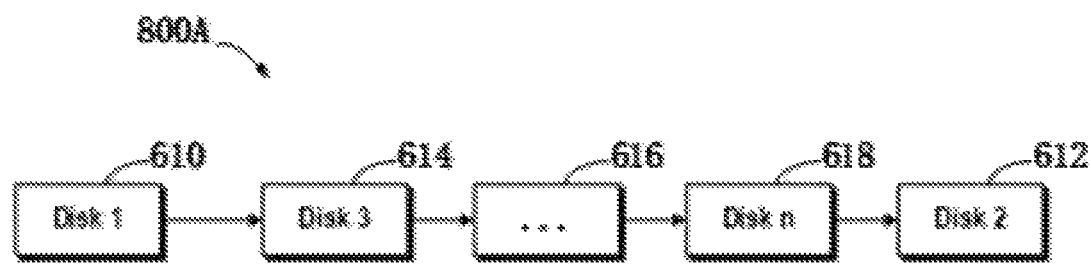
FIGS. 8A, 8B and 8C each schematically illustrate a block diagram of an updated historical record according to one implementation of the present disclosure.

A detailed description is presented to specific meaning of block 750: a node indicating the current storage device is moved to an endpoint of a given historical record, which given historical record is a historical record on a storage device where an extent previously added to the given stripe is located. Specifically, in block 750, a historical record on a storage device (i.e., disk 1) where an extent previously selected for the stripe is located is updated on the basis of disk 2. With reference to FIG. 6, the historical record on disk 1 is the first linked list in FIG. 6. Therefore, a node indicating disk 2 in the linked list may be moved to the end of the linked list. At this point, the node 612 indicating disk 2 is moved to follow the node 618 that indicates disk n, and the updated historical record on disk 1 is as shown in FIG. 8A.

In block 760, an extent is selected from disk 2, and the utilization ratio of disk 2 is updated to 1/16. In block 770, the state record may be updated as below: a node indicating a storage device where an extent previously added to the given stripe is located is moved to the endpoint of a historical record on the storage device. Continuing the foregoing example, at this point a storage device where an extent previously selected for the stripe is located is disk 1, and a current storage device is disk 2, so the node indicating disk 1 is moved to the end of the historical record for disk 2. With reference to FIG. 6, the second linked list is the historical record on disk 2. At this point, the node 628 is already at the end of the linked list, so the step of moving may be omitted.

So far, the $1^{st}$ and $2^{nd}$ extents for the stripe have been selected. Then, the $3^{rd}$ extent for the stripe may be selected using the method described above. The operation returns to step 740, where since the historical record (i.e., the second linked list in FIG. 6) on the current storage device (disk 2) points to disk 3, disk 3 is treated as a current storage device.

Figure 8B:
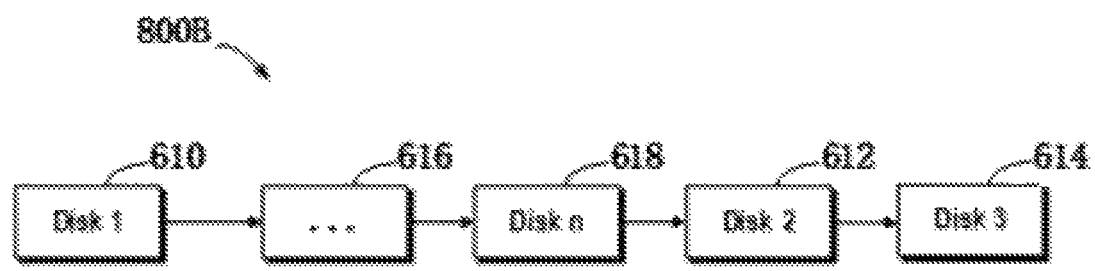
Figure 8C:
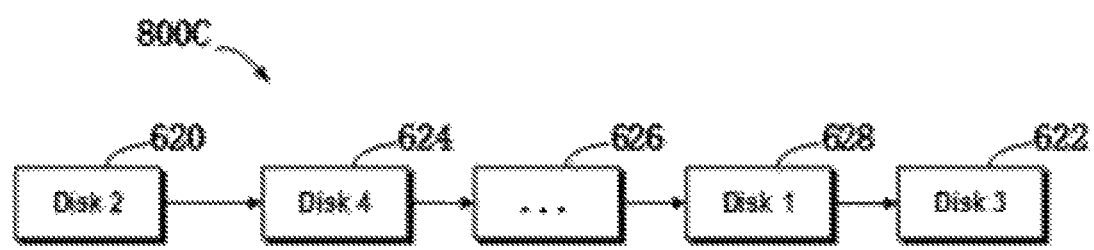

In block 750, historical records on storage devices (i.e., disk 1 and disk 2) where extents previously selected for the stripe are located are updated on the basis of disk 3. With reference to FIG. 6, the historical record on disk 1 is the first linked list in FIG. 6, so a node indicating disk 3 in the linked list may be moved to the end of the linked list. At this point, the node 614 indicating disk 3 is moved to follow the node 612 indicating disk 1, and the updated historical record on disk 1 is as shown in FIG. 8B. The historical record on disk 2 is the second linked list in FIG. 6, so a node indicating disk 3 in the linked list may be moved to the end of the linked list. At this point, the node 622 indicating disk 3 is moved to follow the node 618 indicating disk 1, and the updated historical record on disk 2 is as shown in FIG. 8C.

Next, in block 760, an extent is selected from disk 3, and the utilization ratio of disk 3 is updated to 1/16. In block 770, storage devices where extents previously selected for the stripe are located are disk 1 and disk 2, and the current storage device is disk 3, so nodes indicating disk 1 and disk 2 should be moved to the end of the historical record on disk 3. With reference to FIG. 6, the third linked list is the historical record on disk 3. At this point, since nodes indicating disk 1 and disk 2 are already at the end of the linked list, the step of moving may be omitted.

On the basis of the foregoing principles, the operations shown in block 730 to block 770 are repeated, the $4^{th}$ to $5^{th}$ extents in the stripe may be selected similarly, and further creation of the stripe is completed. After one stripe in the storage system 430 is created using the method 700 shown in FIG. 7, the method 700 may be repetitively performed to create other stripes in the storage system 430, until the number of stripes in the storage system 430 reaches the predefined number.

Figure 9:
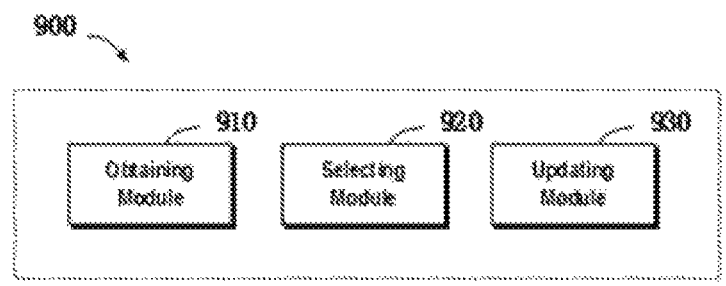
FIG. 9 schematically illustrates a block diagram of a device for managing a storage system according to one implementation of the present disclosure.

FIG. 9 schematically shows a block diagram of a device 900 for managing a storage system according to one implementation of the present disclosure. As shown in this figure, there is provided a device 900 for managing a storage system according to one implementation of the present disclosure. The device 900 comprises: an obtaining module 910 configured to obtain a state record on utilization of a resource pool for creating the storage system, the resource pool comprising a first number of storage devices, the state record comprising a time sequence in which extents in the first number of storage devices are selected to create the storage system; a selecting module 920 configured to select extents from the first number of storage devices to create the storage system according to the state record; and an updating module 930 configured to update the state record on the basis of the selected extents.

According to one implementation of the present disclosure, the device further comprises: a determining module configured to determine a predefined number of stripes to be comprised in the storage system. The selecting module 920 is further configured to: according to the state record, select extents from the first number of storage devices to create stripes in the storage system until the number of stripes in the storage system meets the predefined number of the stripes.

According to one implementation of the present disclosure, the determining module is further configured to: regarding a given stripe in the storage system, determine a predefined number of extents to be comprised in the given stripe. The selecting module 920 is further configured to: select from the resource pool extents to be comprised in the given stripe on the basis of the state record, until the number of extents in the given stripe meets the predefined number of the extents.

According to one implementation of the present disclosure, the state record further comprises a utilization ratio of a corresponding storage device among the first number of storage devices. The selecting module 920 is further configured to: select a current extent to be comprised in the given stripe from a storage device with a lower utilization ratio among the first number of storage devices.

According to one implementation of the present disclosure, the updating module 930 is further configured to: update a utilization ratio of a storage device where the current extent is located.

According to one implementation of the present disclosure, the selecting module 920 is further configured to: take the least recently used storage device among the first number of storage devices as a current storage device according to the time sequence; and select extents to be comprised in the given stripe from the current storage device.

According to one implementation of the present disclosure, the time sequence comprises a historical record on a corresponding storage device among the first number of storage devices. The historical record further comprises: a node indicating the corresponding storage device, and a plurality of nodes indicating further storage devices besides the corresponding storage device among the first number of storage devices.

According to one implementation of the present disclosure, the plurality of nodes are arranged in a time sequence that extents in the further storage devices are selected to create the storage system.

According to one implementation of the present disclosure, the updating module 930 is further configured to: move a node indicating the current storage device to an endpoint of a given historical record, which given historical record is a historical record on a storage device where an extent previously selected to create the given stripe is located.

According to one implementation of the present disclosure, the updating module 930 is further configured to: move a node, which indicates a storage device where an extent previously selected to create the given stripe is located, to an endpoint of a historical record on the storage device.

In one implementation of the present disclosure, there is provided a device for managing a storage system. The device comprises: one or more processors; a memory coupled to at least one processor of the one or more processors; computer program instructions stored in the memory which, when executed by the at least one processor, cause the device to execute a method for managing a storage system. The method comprises: obtaining a state record on utilization of a resource pool for creating the storage system, the resource pool comprising a first number of storage devices, the state record comprising a time sequence in which extents in the first number of storage devices are selected to create the storage system; selecting extents from the first number of storage devices to create the storage system according to the state record; and updating the state record on the basis of the selected extents.

According to one implementation of the present disclosure, the method further comprises: determining a predefined number of stripes to be comprised in the storage system; and wherein the selecting extents from the first number of storage devices to create the storage system comprises: according to the state record, selecting extents from the first number of storage devices to create stripes in the storage system until the number of stripes in the storage system meets the predefined number of the stripes.

According to one implementation of the present disclosure, the creating stripes in the storage system comprises: regarding a given stripe in the storage system, determining a predefined number of extents to be comprised in the given stripe; and selecting from the resource pool extents to be comprised in the given stripe on the basis of the state record, until the number of extents in the given stripe meets the predefined number of the extents.

According to one implementation of the present disclosure, the state record further comprises a utilization ratio of a corresponding storage device among the first number of storage devices; and the selecting from the resource pool extents to be comprised in the given stripe on the basis of the state record comprises: selecting a current extent to be comprised in the given stripe from a storage device with a lower utilization ratio among the first number of storage devices.

According to one implementation of the present disclosure, the updating the state record on the basis of the selected extents comprises: updating a utilization ratio of a storage device where the current extent is located.

According to one implementation of the present disclosure, the selecting from the resource pool extents to be comprised in the given stripe on the basis of the state record comprises: taking the least recently used storage device among the first number of storage devices as a current storage device according to the time sequence; and selecting extents to be comprised in the given stripe from the current storage device.

According to one implementation of the present disclosure, the time sequence comprises a historical record on a corresponding storage device among the first number of storage devices, the historical record further comprising: a node indicating the corresponding storage device, and a plurality of nodes indicating further storage devices besides the corresponding storage device among the first number of storage devices.

According to one implementation of the present disclosure, the plurality of nodes are arranged in a time sequence that extents in the further storage devices are selected to create the storage system.

According to one implementation of the present disclosure, the updating the state record on the basis of the selected extents further comprises: moving a node indicating the current storage device to an endpoint of a given historical record, which given historical record is a historical record on a storage device where an extent previously selected to create the given stripe is located.

According to one implementation of the present disclosure, the updating the state record on the basis of the selected extents further comprises: moving a node, which indicates a storage device where an extent previously selected to create the given stripe is located, to an endpoint of a historical record on the storage device.

In one implementation of the present disclosure, there are provided computer program instructions which, when executed by at least one processor, cause the at least one processor to execute a method for managing a storage system as described above.

The flowchart and block diagrams in the Figures illustrate the architecture, functionality, and operation of possible implementations of systems, methods and computer program products according to various implementations of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks illustrated in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

The invention claimed is:

1. A method for managing a storage system, comprising:
    obtaining a state record on utilization of a resource pool for creating the storage system, the resource pool comprising a first number of storage devices, the state record comprising a time sequence in which extents in the first number of storage devices are selected to create the storage system;
    selecting extents from the first number of storage devices to create the storage system according to the state record;
    updating the state record on the basis of the selected extents; and
    determining a predefined number of stripes to be comprised in the storage system; and
    wherein selecting the extents from the first number of storage devices to create the storage system comprises:
    according to the state record, selecting extents from the first number of storage devices to create stripes in the storage system until the number of stripes in the storage system meets the predefined number of the stripes.

2. The method according to claim 1, wherein the creating stripes in the storage system comprises: regarding a given stripe in the storage system,
    determining a predefined number of extents to be comprised in the given stripe; and
    selecting from the resource pool extents to be comprised in the given stripe on the basis of the state record, until the number of extents in the given stripe meets the predefined number of the extents.

3. The method according to claim 2, the state record further comprises a utilization ratio of a corresponding storage device among the first number of storage devices; and
    wherein the selecting from the resource pool extents to be comprised in the given stripe on the basis of the state record comprises: selecting a current extent to be comprised in the given stripe from a storage device with a lower utilization ratio among the first number of storage devices.

4. The method according to claim 3, wherein the updating the state record on the basis of the selected extents comprises:
    updating a utilization ratio of a storage device where the current extent is located.

5. The method according to claim 3, wherein the selecting from the resource pool extents to be comprised in the given stripe on the basis of the state record further comprises:
    taking the least recently used storage device among the first number of storage devices as a current storage device according to the time sequence; and
    selecting extents to be comprised in the given stripe from the current storage device.

6. The method according to claim 5, wherein the time sequence comprises a historical record on a corresponding storage device among the first number of storage devices, the historical record further comprising:
    a node indicating the corresponding storage device, and a plurality of nodes indicating further storage devices besides the corresponding storage device among the first number of storage devices.

7. The method according to claim 6, wherein the plurality of nodes are arranged in a time sequence that extents in the further storage devices are selected to create the storage system.

8. The method according to claim 7, wherein the updating the state record on the basis of the selected extents further comprises:
    moving a node indicating the current storage device to an endpoint of a given historical record, the given historical record is a historical record on a storage device where an extent previously selected to create the given stripe is located.

9. The method according to claim 8, wherein the updating the state record on the basis of the selected extents further comprises:
    moving a node, which indicates a storage device where an extent previously selected to create the given stripe is located, to an endpoint of a historical record on the storage device.

10. A device for managing a storage system, comprising:
    one or more processors;
    a memory coupled to at least one processor of the one or more processors;
    computer program instructions stored in the memory which, when executed by the at least one processor, cause the device to execute a method for managing a storage system, the method comprising:
        obtaining a state record on utilization of a resource pool for creating the storage system, the resource pool comprising a first number of storage devices, the state record comprising a time sequence in which extents in the first number of storage devices are selected to create the storage system;
        selecting extents from the first number of storage devices to create the storage system according to the state record;
        updating the state record on the basis of the selected extents; and
        determining a predefined number of stripes to be comprised in the storage system; and
        wherein selecting the extents from the first number of storage devices to create the storage system comprises:
        according to the state record, selecting extents from the first number of storage devices to create stripes in the storage system until the number of stripes in the storage system meets the predefined number of the stripes.

11. The device according to claim 10, wherein the creating stripes in the storage system comprises: regarding a given stripe in the storage system,
    determining a predefined number of extents to be comprised in the given stripe; and
    selecting from the resource pool extents to be comprised in the given stripe on the basis of the state record, until the number of extents in the given stripe meets the predefined number of the extents.

12. The device according to claim 11, the state record further comprises a utilization ratio of a corresponding storage device among the first number of storage devices; and wherein the selecting from the resource pool extents to be comprised in the given stripe on the basis of the state record comprises: selecting a current extent to be comprised in the given stripe from a storage device with a lower utilization ratio among the first number of storage devices.

13. The device according to claim 12, wherein the updating the state record on the basis of the selected extents comprises:

updating a utilization ratio of a storage device where the current extent is located.

14. The device according to claim 12, wherein the selecting from the resource pool extents to be comprised in the given stripe on the basis of the state record further comprises:

taking the least recently used storage device among the first number of storage devices as a current storage device according to the time sequence; and selecting extents to be comprised in the given stripe from the current storage device.

15. The device according to claim 14, wherein the time sequence comprises a historical record on a corresponding storage device among the first number of storage devices, the historical record further comprising: a node indicating the corresponding storage device, and a plurality of nodes indicating further storage devices besides the corresponding storage device among the first number of storage devices.

16. The device according to claim 15, wherein the plurality of nodes are arranged in a time sequence that extents in the further storage devices are selected to create the storage system.

17. The device according to claim 16, wherein the updating the state record on the basis of the selected extents further comprises:

moving a node indicating the current storage device to an endpoint of a given historical record, the given historical record is a historical record on a storage device where an extent previously selected to create the given stripe is located.

18. The device according to claim 17, wherein the updating the state record on the basis of the selected extents further comprises:

moving a node, which indicates a storage device where an extent previously selected to create the given stripe is located, to an endpoint of a historical record on the storage device.

19. The method according to claim 1, wherein selecting the extents from the first number of storage devices to create the stripes includes:

choosing extents to form new stripes from storage devices of the resource pool that are least recently used.

20. A computer program product having a non-transitory computer readable medium which stores a set of instructions to manage a storage system; the set of instructions, when carried out by computerized circuitry, causing the computerized circuitry to perform a method of:

obtaining a state record on utilization of a resource pool for creating the storage system, the resource pool comprising a first number of storage devices, the state record comprising a time sequence in which extents in the first number of storage devices are selected to create the storage system;

selecting extents from the first number of storage devices to create the storage system according to the state record;

updating the state record on the basis of the selected extents; and determining a predefined number of stripes to be comprised in the storage system; and wherein selecting the extents from the first number of storage devices to create the storage system comprises:

according to the state record, selecting extents from the first number of storage devices to create stripes in the storage system until the number of stripes in the storage system meets the predefined number of the stripes.

* * * * *